US010439407B2

(12) United States Patent
Götz

(10) Patent No.: US 10,439,407 B2
(45) Date of Patent: Oct. 8, 2019

(54) CHARGING APPARATUS WITH A PHASE UNIT HAVING MULTIPLE STRANDS

(71) Applicant: Dr. Ing. h.c. F. Porsche Aktiengesellschaft, Stuttgart (DE)

(72) Inventor: Stefan Götz, Forstern (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 142 days.

(21) Appl. No.: 15/825,497

(22) Filed: Nov. 29, 2017

(65) Prior Publication Data
US 2018/0152032 A1 May 31, 2018

(30) Foreign Application Priority Data
Nov. 30, 2016 (DE) .......... 10 2016 123 066

(51) Int. Cl.
H01M 10/46 (2006.01)
H02J 7/00 (2006.01)
H02J 7/02 (2016.01)
B60L 53/20 (2019.01)
B60L 53/30 (2019.01)
B60L 53/10 (2019.01)
H02M 1/00 (2006.01)

(52) U.S. Cl.
CPC ............ *H02J 7/0027* (2013.01); *B60L 53/11* (2019.02); *B60L 53/20* (2019.02); *B60L 53/30* (2019.02); *H02J 7/022* (2013.01); *H02M 2001/0067* (2013.01); *H02M 2001/0083* (2013.01); *Y02T 10/7005* (2013.01); *Y02T 10/7072* (2013.01); *Y02T 90/121* (2013.01); *Y02T 90/127* (2013.01); *Y02T 90/128* (2013.01); *Y02T 90/14* (2013.01)

(58) Field of Classification Search
CPC ...... H02J 7/0018; H02J 7/0026; H02J 7/0021; H02J 7/007
USPC ................ 320/116, 118, 128, 132
See application file for complete search history.

(56) References Cited

U.S. PATENT DOCUMENTS

2003/0038612 A1   2/2003  Kutkut
2010/0097031 A1*  4/2010  King ............ H02J 7/0045
                                              320/109
2013/0293163 A1* 11/2013  Flett ........... H02P 27/08
                                              318/139

FOREIGN PATENT DOCUMENTS

DE   102010052934 A1   5/2012
EP       2815913 A1   12/2014

OTHER PUBLICATIONS

German Search Report for German Application No. 10 2016 123 066.9, dated September 7, 2017, with partial English translation—8 pages.

* cited by examiner

*Primary Examiner* — Edward Tso
(74) *Attorney, Agent, or Firm* — RatnerPrestia

(57) ABSTRACT

A charging apparatus for charging electrical energy stores for motor vehicles, having a conversion device for converting a power supplied from a medium-voltage grid to a power suitable for the charging process of the energy store. Here, the conversion device includes at least one phase unit connected to at least one phase of the medium-voltage grid, said phase unit having at least two strands, namely at least one strand for a positive component of the phase and at least one strand for a negative component of the phase. At least one module, having at least one input unit and at least one inverter unit and at least one transformer unit and at least one (Continued)

rectifier unit associated with the transformer unit and at least one output unit, is associated in each case with the strands.

16 Claims, 5 Drawing Sheets

CHARGING APPARATUS WITH A PHASE UNIT HAVING MULTIPLE STRANDS

CROSS-REFERENCE TO RELATED APPLICATIONS

This application claims priority to German Patent Application No. DE 10 2016 123 066.9, filed Nov. 30, 2016, which is incorporated by reference herein in its entirety.

FIELD OF THE INVENTION

The present invention relates charging apparatus for charging electrical energy stores for motor vehicles.

BACKGROUND OF THE INVENTION

The energy stores of electric vehicles are usually charged at a charging column, which is connected to a public power supply system. For this purpose, use is generally made of charging systems, which are designed exclusively for a low-voltage connection, that is to say below 1500 V and, for example, for a 400 V three-phase system.

However, charging a plurality of vehicles in what are known as car charging parks requires higher powers, with the result that it is necessary to resort to the medium-voltage grid. The grid transformers required for this purpose, however, have disadvantages in terms of size and cost and are also linked to the grid frequency, as a result of which high losses occur.

The prior art has therefore disclosed charging systems that manage without a grid transformer. These charging systems are equipped with a series connection of power semiconductors for that purpose. However, such an interconnection arrangement of power semiconductors requires a very high degree of complexity with regard to balancing, since otherwise there is a high risk of uneven distribution of the voltage to the individual semiconductors and therefore a high risk of breakdowns of the individual semiconductors.

SUMMARY OF THE INVENTION

In contrast, it is an object of the present invention to provide an improved and preferably uncomplicated and cost-efficient connection of a charging apparatus for electrical energy stores of motor vehicles to a medium-voltage grid.

Said object is achieved by a charging apparatus having the features of claim 1. Preferred features are the subject matter of the sub-claims. Further advantages and features emerge from the general description of the invention and the description of the exemplary embodiments.

The charging apparatus according to aspects of the invention serves for charging electrical energy stores for motor vehicles and preferably electric vehicles. The charging apparatus comprises at least one conversion device for converting a power or voltage and current, supplied from a medium-voltage grid to a power, or voltage and current, suitable for the charging process of the energy store. Here, the conversion device comprises at least one phase unit connected to at least one phase of the medium-voltage grid. The phase unit comprises at least two strands, namely at least one strand for a positive component of the phase and at least one strand for a negative component of the phase. At least one module is associated in each case with the strands. Here, a module comprises at least one input unit and at least one inverter unit and at least one transformer unit and at least one rectifier unit associated with the transformer unit and at least one output unit.

The charging apparatus according to aspects of the invention offers many advantages. One advantage is that the power required for the charging process can be supplied directly from the medium-voltage grid in a cost-effective manner with low losses due to the modular design of the conversion device. As a result, it is possible to dispense with costly rectifier cascades that have high losses and are susceptible to faults. The modular conversion device also offers a high power density and a small physical size as well as low material costs. It is also possible to make adjustments to desired input and output powers in an uncomplicated manner.

In particular, the module comprises at least one interconnection arrangement. In particular, the inverter unit is connected downstream of the input unit. The transformer unit having the rectifier unit, and the output unit are connected downstream of the inverter unit. In particular, the power, or the charge voltage and the charge current, required for the charging process can be tapped at the output unit. The output unit comprises at least one positive and/or at least one negative output.

In particular, the input unit is on a primary side of the module. In particular, the output unit is on a secondary side of the module. Within the scope of the present invention, a primary side and secondary side, respectively, of a module should be understood to mean that part of the module that is associated with the primary side and secondary side, respectively, of the transformer unit.

In particular, a phase unit comprises a plurality of modules, for example at least five or ten or 15 or more modules.

At least two modules are preferably associated in each case with the strands. A plurality of modules is particularly preferably associated in each case with the strands. For example, one strand may comprise three or four or even five or more modules. In particular, at least five modules are associated with each strand. It is also possible for at least ten or even 20 or more modules to be associated with each strand. In this case, the strands can have the same number or else a different number of modules. In particular, the number of modules is adapted to the voltage provided by the medium-voltage grid and/or adapted to the number of charging points.

Here, the modularized design offers the possibility of adapting the number of modules in a very uncomplicated manner. For example, the number of modules is adapted to a size of a car charging park.

The modules of the phase unit are preferably interconnected in series by their input units. In particular, the modules are interconnected in series with one another on their primary side. In particular, the modules of a strand and preferably also various strands of a phase unit are interconnected in series with one another.

In all configurations, it is preferable for the phase unit to comprise at least one DC isolation between the medium-voltage grid and an energy store that is to be charged. At least one DC isolation is preferably provided by at least one transformer unit. In particular, each module provides a DC isolation using its transformer unit. There may be provision for at least one DC isolation arranged outside the transformer device. There may also be provision for another suitable protective isolation as a DC isolation.

In particular, the primary side is DC-isolated from the secondary side of the module. This affords significant advantages, since the secondary side, or the output units, of the modules can be interconnected with high levels of freedom. For example, the output units of the modules can be interconnected arbitrarily permanently in series and/or in parallel or else in a reconfigurable manner, in order to supply one or more charging points.

The conversion device preferably comprises at least two and particularly preferably at least three phase units. The conversion device can also comprise a plurality of phase units. In particular, at least one phase unit is provided in each case for the phases provided by the medium-voltage grid. It is also possible for only one part of the available phases of the medium-voltage grid to be connected to the charging apparatus. It is also possible for two or more phase units to be associated with one phase of the medium-voltage grid. The modular design has the advantage here that the charging apparatus can be adapted to the size of a car charging park in a very uncomplicated and cost-effective manner by adding or omitting phase units.

In particular, the phase units are interconnected with one another by means of their strands and preferably interconnected in parallel. In particular, the strands of the phase units are interconnected in parallel to form a common negative strand and to form a common positive strand. The phase units can also be interconnected separately. It is possible for a series interconnection arrangement of the phase units to be provided.

Those phase units that are fed by various phases of the medium-voltage grid are particularly preferably interconnected with one another and preferably interconnected in parallel. For example, three phase units are interconnected to form a three-phase medium-voltage connection. In this case, a phase-shifted arrangement can be provided, for example by 120°.

In particular, the input units of the positive and of the negative strand are suitable and configured for allowing only the positive or only the negative component of the phase to pass. For this purpose, the input units respectively have, in particular, at least one correspondingly directed diode device or a rectifier device. A rectifier device comprises at least one rectifier or at least one diode device. A rectifier device can also comprise at least one capacitor, for example a DC link capacitor. In particular, a direct current and in particular a pulsating direct current can be generated by the input units. In particular, the direct current is fed to the inverter unit.

It is possible for the input unit to comprise at least one passive rectifier device. This enables a particularly cost-effective implementation of the charging apparatus.

It is also possible for the input unit to comprise at least one active rectifier device. The active rectifier device preferably has at least one phase gating controller and/or at least one insulated-gate bipolar transistor (IGBT) and/or at least one field-effect transistor (FET). As a result, it is possible to adapt the medium-voltage grid to the grid conditions in a particularly targeted manner.

In one advantageous configuration, the modules are at least partially operatively connected to one another by at least one control device. In particular, the input units and/or the inverter units of the modules can be driven by the control device. It is therefore possible to achieve a particularly uniform power consumption and hence simple balancing of the semiconductors. It is also possible for at least one part of the modules to be operatively connected to various phase units by means of the control device. It is also possible for the modules of various strands and/or the same strand to be operatively connected to one another by means of the control device.

It is also possible for the input units and/or the inverter units to be configured to be self-regulating.

In particular, the inverter unit comprises at lest one dual-active-bridge device with or without soft switching means. The inverter unit can also comprise at least one five-level neutral-point-clamped (NPC) inverter with or without soft switching means. Configurations of this kind enable the inverter units to be driven particularly well.

The modules are particularly preferably at least partially interconnected in parallel and/or in series by means of their output units. A parallel and/or series or mixed interconnection arrangement of the modules on their secondary side is therefore possible. For example, the modules of a phase unit and/or the modules of different phase units can be at least partially interconnected in parallel and/or in series by means of their output units. It is also possible for the modules of the same strand or different strands to be interconnected in parallel and/or in series by means of their output units. Such interconnection arrangements make it possible to feed a plurality of charging points at the same time particularly well. It is also possible, however, for the modules to be at least partially interconnected separately by means of their output units.

It is possible for the output units to be interconnected in a controllable manner such that it is possible to change between a parallel and a series and a mixed interconnection arrangement depending on a characteristic variable. In particular, provision is also made for at least one control device, which is operatively connected to the modules, or to the output units. For example, the characteristic variable describes the states of charge of the connected energy stores and/or the utilization of the charging apparatus. The interconnection arrangement can therefore be unconfigured in a particularly quick and uncomplicated manner in order to react to the utilization of a car charging park.

In one preferred configuration, the charging apparatus comprises a plurality of charging points, to which in each case at least one energy store for motor vehicles can be coupled. In each case, one charging point can be supplied with the power required for a charging process of the energy store by a plurality of modules and/or a plurality of phase units. However, one charging point can also be supplied with power by one individual module. In particular, each module is suitable and configured for supplying at least one charging point with power individually and/or in combination with other modules. It is possible for at least one output contactor to be provided for each charging point.

BRIEF DESCRIPTION OF THE DRAWINGS

Further advantages and features of the present invention will emerge from the exemplary embodiment, which will be discussed below with reference to the appended figures.

In the figures.

DETAILED DESCRIPTION OF THE INVENTION

Figure 1:
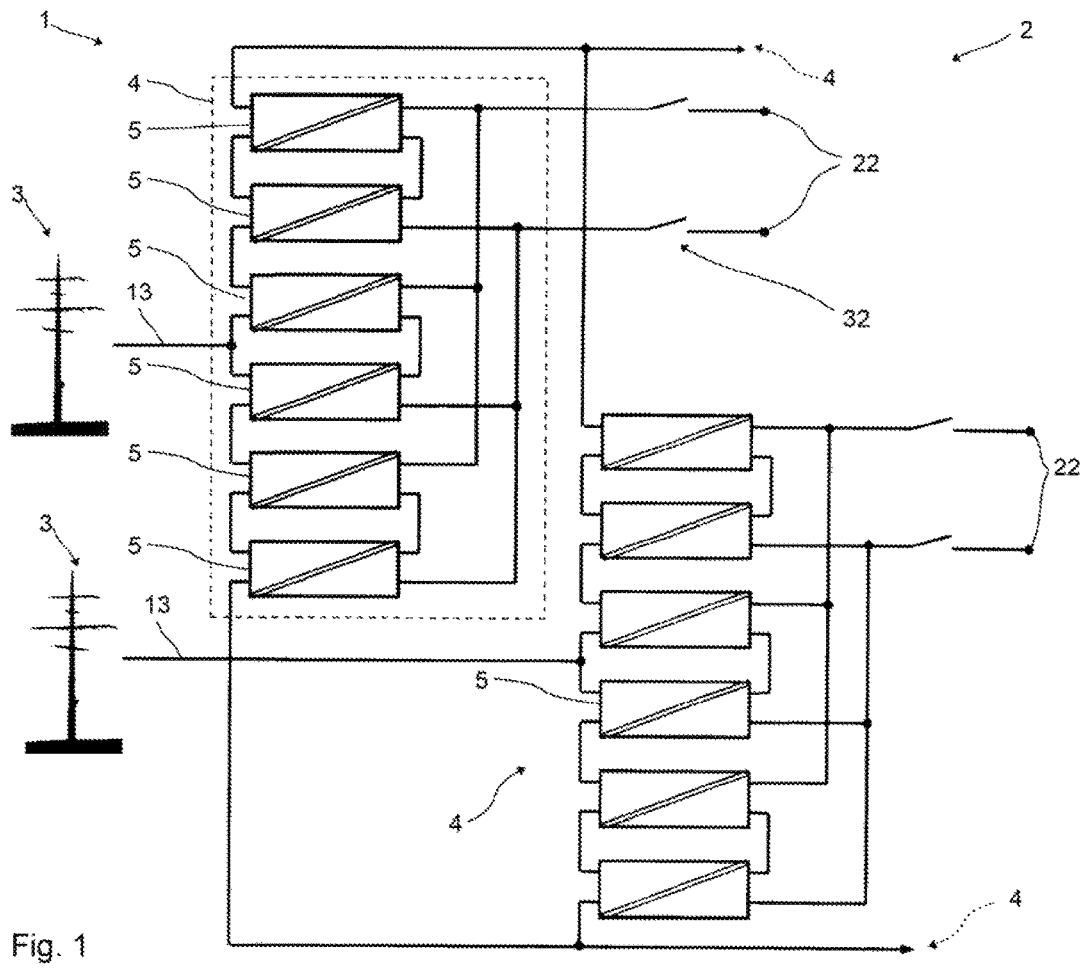
FIG. 1 shows a charging apparatus according to aspects of the invention in a purely schematic illustration.

FIG. 1 shows a charging apparatus 1 according to aspects of the invention for charging electrical energy stores for motor vehicles having a conversion device 2. The conversion device 2 serves for converting a power supplied from a medium-voltage grid 3 to a power suitable for the charging process of the energy stores. The voltage of the medium-voltage grid 3 is 10 kV, 20 kV or even 30 kV, for example. Higher or lower voltages are also possible.

The conversion device 2 in this case comprises two phase units 4. Each phase unit 4 is coupled here to a phase 13 of the medium-voltage grid 3. As an alternative, the phase units 4 can also be interconnected with one or more further phase units 4. These phase units 4 can then be connected to the medium-voltage grid 3 by means of a separate phase 13 or be connected to the two phases 13 shown here.

The two phase units 4 are in this case designed in a similar manner and each comprise five modules 5. In order to be better able to associate the modules 5 with a phase unit 4, a phase unit 4 is bordered by a dashed line here. Phase units 4 having a relatively large number of modules 5 are preferred. For example, given a voltage of the medium-voltage grid of 20 kV, a phase unit 4 comprises at least 15-20 modules 5. The modules 5 are described in more detail with reference to FIG. 2.

Here, the two phase units 4 provide two charging points 22. An electric vehicle, or an electrical energy store, can be coupled in each case to the charging points 22 and be charged, for example. The supply cables to the charging points 22 are each secured here with an output contactor 32.

Figure 2:
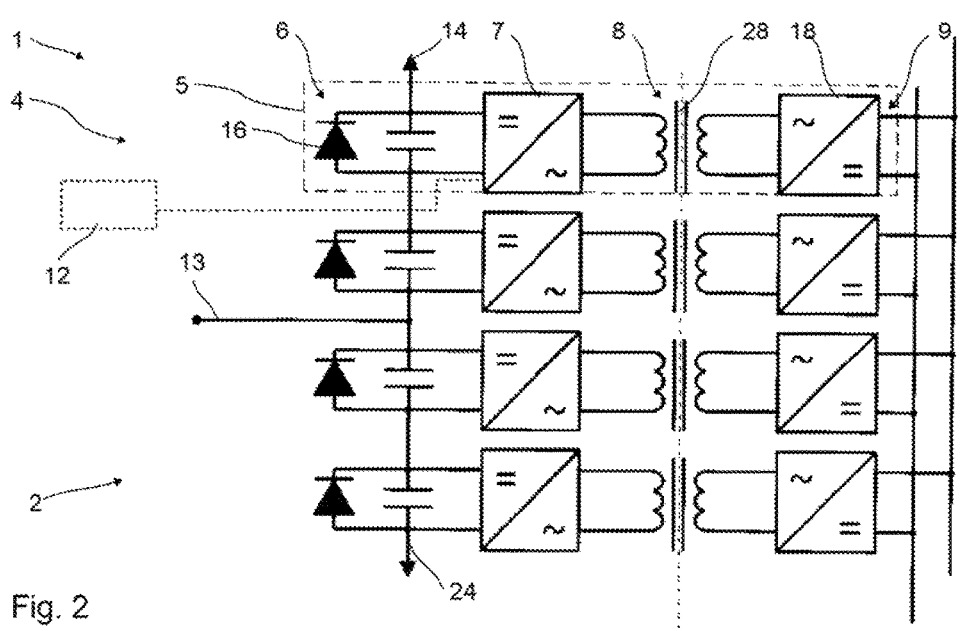
FIG. 2 shows a purely schematic illustration of a phase unit.

FIG. 2 illustrates an individual phase unit 4 of the conversion device 2 in more detail. The phase unit 4 in this case comprises a positive strand 14 and a negative strand 24. In this case, two modules 5 are connected to each strand 14, 24. However, at least 5 or 10 or more modules are preferably provided per strand 14, 24. In order to better illustrate the components associated with a module 5, the top module 5 is bordered here with a dashed line. In this case, the modules 5 are interconnected in series on their primary side.

One module 5 comprises here an input unit 6. The input unit 6 is furnished with a rectifier device 16 and a DC link capacitor. The positive component of the phase 13 is therefore allocated to the positive strand 14 and the negative component is therefore allocated to the negative strand 24. A direct current, which may be configured to be pulsating, is then provided for each module 5 by the input unit 6. The rectifier device 16 is configured to be passive, for example.

An inverter unit 7 is in this case connected downstream of the input unit 6 for increasing the frequency. For example, the frequency of the input current is thus lifted by a factor of 100 or 1000 or even higher. For example, the input current has a frequency of 50 Hz, which is lifted to 50 kHz by the inverter unit 7. The frequency may also be increased to 200 kHz or 400 kHz or even higher. Increasing the frequency enables a higher power density and a significantly smaller physical size and therefore also lower material costs of the corresponding component parts.

A transformer unit 8 is connected downstream of the inverter unit 7, in order to transform the AC voltage provided by the inverter unit 7 to a lower voltage level. On account of the high frequencies present here, the transformer unit 8 can also be configured as a transformer.

The transformer unit 8 also enables a DC isolation 28 from the downstream-connected regions of the module 5 to be achieved. The primary side is thus DC-isolated from the secondary side.

The DC isolation 28 is in this case provided for each module 5 of the phase unit 4, such that the modules 5 can be interconnected on their secondary side independently of the primary side. A DC isolation 28 of the charging points 22 from one another and from the grid 3 as well as from ground is thus achieved.

In this case, a rectifier unit 18 is connected downstream of the secondary side of the transformer unit 8. The AC voltage is thus converted to the DC voltage required for the charging process.

An output unit 9 is connected downstream of the rectifier unit 18, said output unit consisting of a positive and a negative output in one particularly simple variant.

In one alternative embodiment, the inverter unit 7 can be controllable by a control device 12. For example, the amplitude and/or the on/off ratio can thus be set in order to influence the power consumption and to configure it to be particularly uniform, for example. For this purpose, the actual voltage or the actual power can be detected and used to set a target voltage or target power. The inverter unit 7 can, however, also be configured to be self-regulating.

Figure 10:
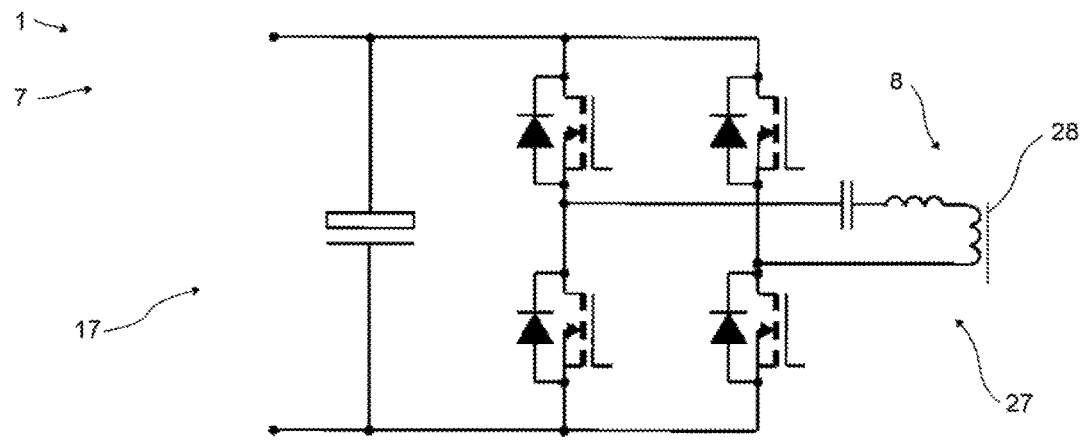
FIG. 10 shows a purely schematic illustration of an inverter unit.
Figure 11:
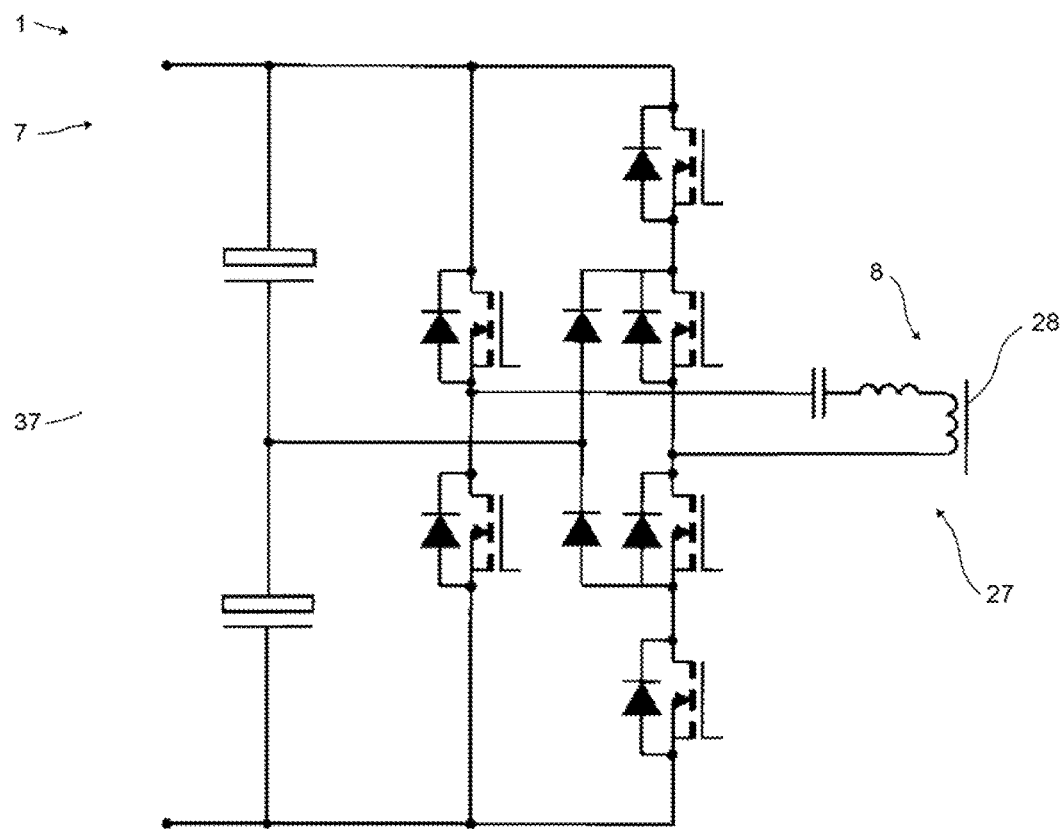
FIG. 11 shows a purely schematic illustration of another inverter unit.

Particularly advantageous configurations of controllable inverter units 7 are shown in FIGS. 10 and 11.

FIG. 10 shows an inverter unit 7, which is configured here with a dual-active-bridge device 17. The inverter unit 7 is also furnished here with a soft switching means 27. This has the advantage that the energy is essentially only let through at resonance points and transmission with particularly low losses is achieved. In one alternative configuration, the inverter unit 7 can be provided with a dual-active-bridge device 17 without soft switching means 27.

FIG. 11 shows an inverter unit 7 with a five-level neutral-point-clamped (NPC) inverter 37. The inverter unit 7 can also be furnished here with a soft switching means 27. An inverter unit 7 of this kind can be driven in a particularly targeted manner with low losses.

Figure 3:
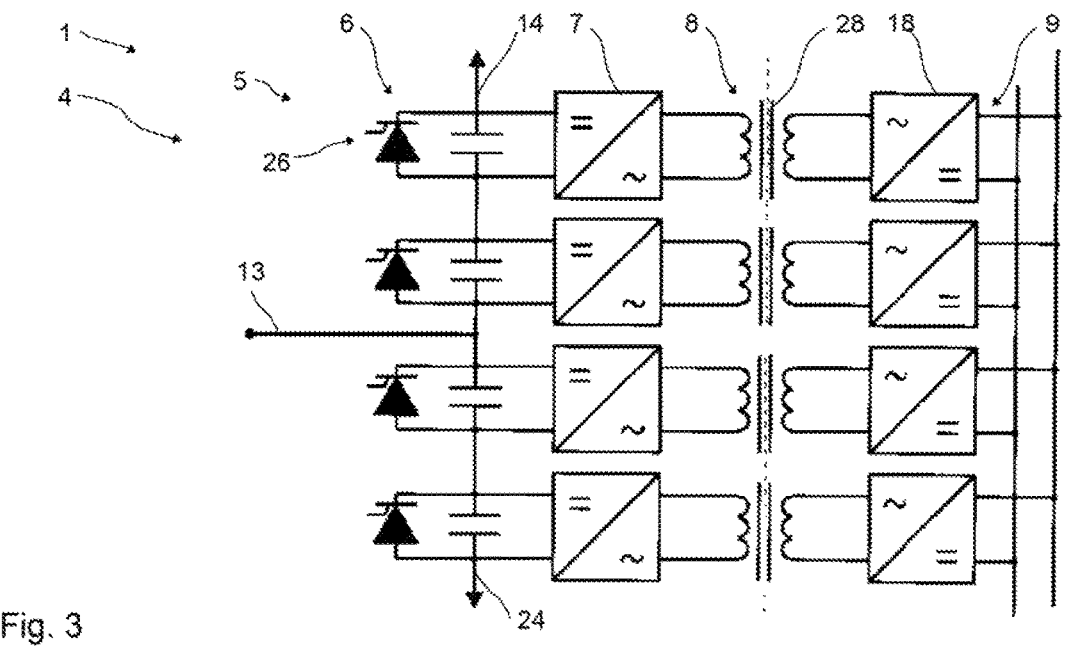
FIG. 3 shows another configuration of a phase unit in a purely schematic illustration.

FIG. 3 shows an alternative configuration of the phase unit 4. In this case, the input units 6 of the respective modules 5 are configured here with a phase gating controller 26. As a result, a pulsating direct current can be provided in a particularly targeted manner.

Figure 4:
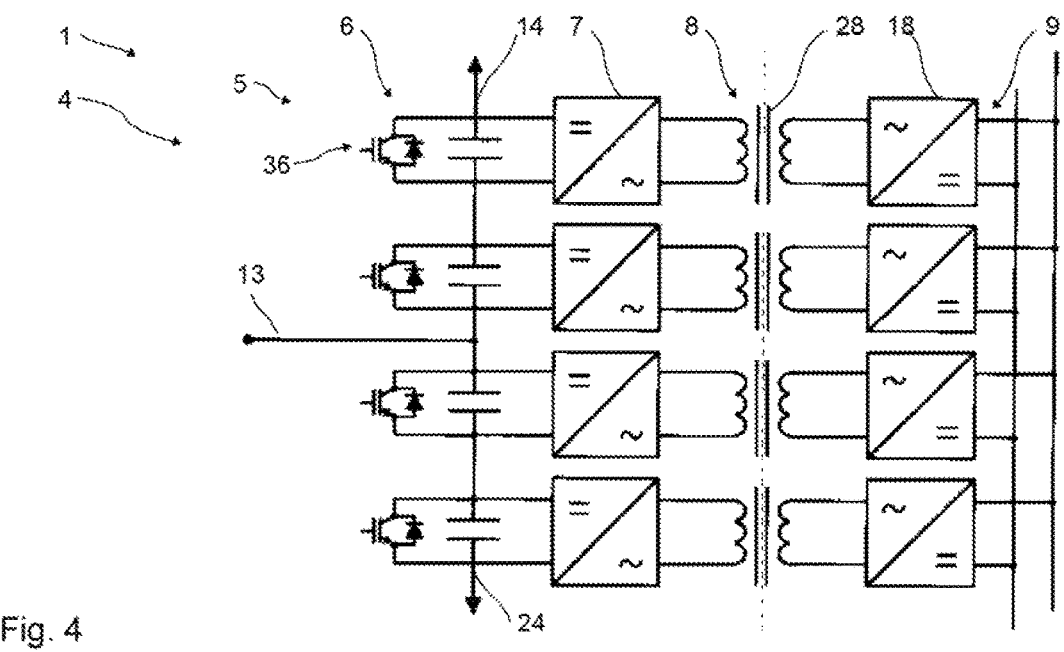
FIG. 4 shows a further configuration of a phase unit in a purely schematic illustration.

FIG. 4 shows a development of the phase unit 4, in which the input units 6 are each furnished with an insulated-gate bipolar transistor (IGBT) 36. In one variant, not shown here, the input units 6 can also be furnished with appropriate field-effect transistors. This also offers an advantageous possibility for active rectification on the primary side of the modules 5.

FIGS. 5-9 each show only the components on the secondary side of the modules 5.

Figure 5:
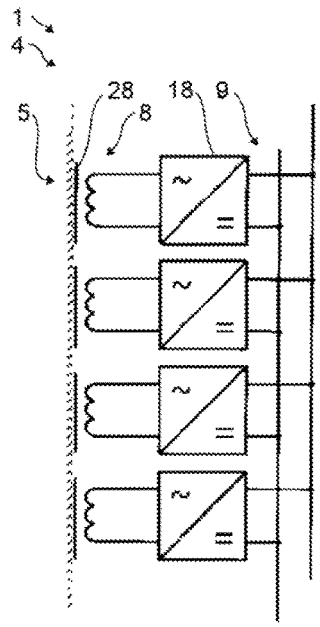
FIGS. 5, 6, 7, 8, and 9 each show a section of a purely schematic phase unit with differently configured interconnection arrangements.

Here, FIG. 5 shows a phase unit 4, in which the modules 5 are interconnected in parallel on their secondary side by the output units 9.

Figure 6:
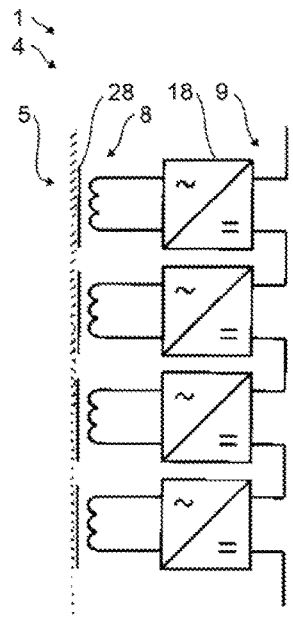
Figure 7:
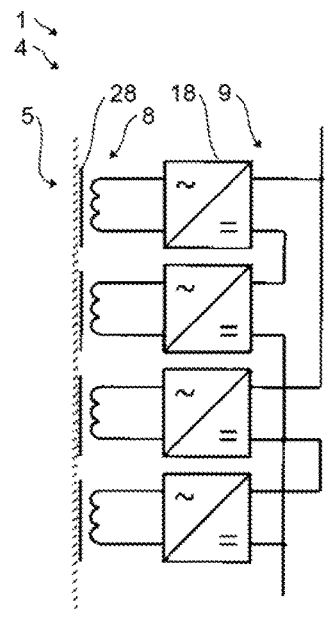

FIG. 6 shows a phase unit 4, in which the modules 5 are interconnected in series on their secondary side by the output units 9.

Fig. shows a mixed interconnection arrangement of the modules 5 of a phase unit 4. Here, the output units 9 are interconnected in series and in parallel with one another.

Figure 8:
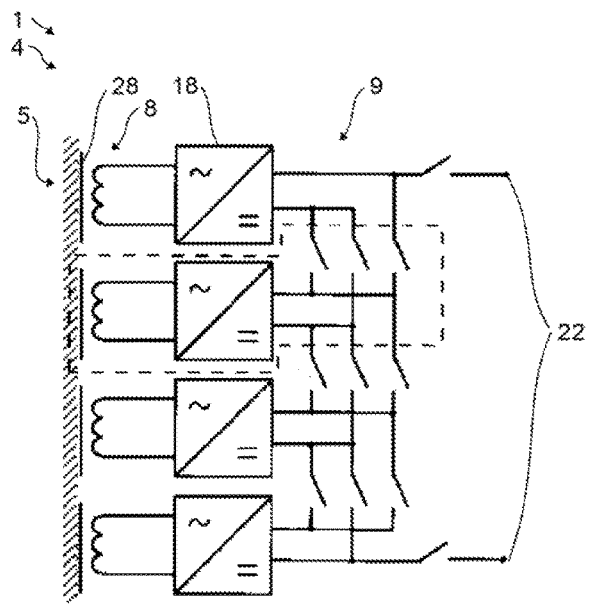

FIG. 8 shows a phase unit 4 with a controllable interconnection arrangement of the output units 9. In this case, the reproducible block of the interconnection arrangement is bordered by a dashed line here. The interconnection arrangement shown enables a reconstructible variant for an arbitrary number of modules 5 with mixed series/parallel interconnection arrangement.

The interconnection arrangement is driven, for example, by a control device 12 depending on a characteristic variable. For example, a state of charge of the connected energy stores or the utilization of the charging apparatus 1 can thus be taken into account as the characteristic variable. For example, the control device 12 is also operatively connected to the modules or the output units 9.

In the configuration shown here, the phase unit 4 provides a charging point 22, for the power supply of which the modules 5 can be interconnected arbitrarily in series and/or in parallel with one another. For example, a plurality of charging points 22 can be operated by a plurality of phase units 4 of this kind.

The controllable interconnection arrangement or the secondary side of the modules 5 enables the conversion device 2 to be adapted to the required power in a targeted and uncomplicated manner and to the number of electric vehicles to be charged in a car charging park, for example.

Figure 9:
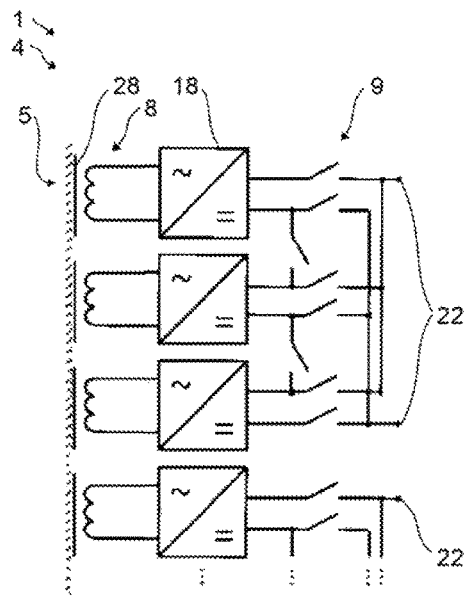

FIG. 9 shows another controllable interconnection arrangement of the output units 9. This interconnection arrangement enables alternation between a parallel and a series interconnection arrangement. The charging points 22 are therefore supplied with power either by parallel-interconnected modules 5 or by series-interconnected modules 5.

Reconfigurable or controllable interconnection arrangements of this kind can be used particularly advantageously in car charging parks, in which energy stores of various voltage classes are intended to be charged. For example, there are thus electric vehicles whose energy stores require a high charge current at a low voltage. On the other hand, there are electric vehicles whose energy stores require lower charge currents with higher voltages. Due to the reconfigurable interconnection arrangement, these various voltage classes can be operated without a problem using a charging apparatus 1.

Figure 12:
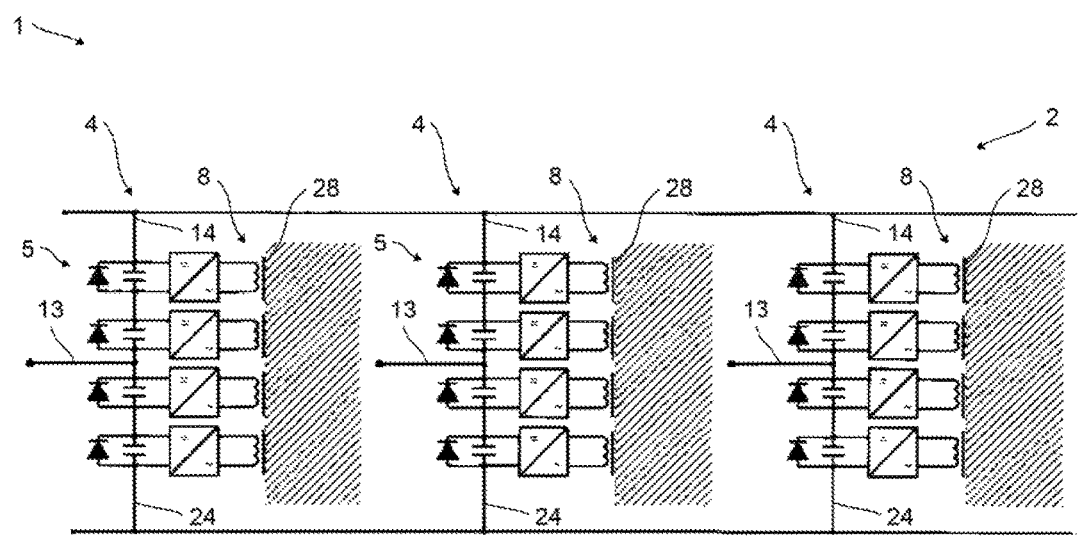
FIG. 12 shows an interconnection arrangement of a plurality of phase units.

FIG. 12 shows one configuration of the conversion device 2 having a total of three phase units 4 to form a three-phase medium-voltage connection. The phase units are in this case each supplied with power by a phase 13 of a medium-voltage grid 3. Here, in each case only the primary side of the individual modules 5 is shown for the purposes of better clarity. The phase units 4 are in this case interconnected in parallel with one another by means of their strands 14, 24.

It is also possible for modules 5 of different phases 13 to be interconnected arbitrarily in series and/or in parallel on the secondary side, not shown here. The modules 5 can be allocated arbitrarily to the charging points 22 of the charging apparatus 1 on account of the DC isolation 28 with their secondary side.

The aspects of the invention presented here offers a direct contact-connection of a medium-voltage grid 3 without using a costly grid transformer. It is also possible to dispense with a series connection of power semiconductors that is susceptible to faults.

The aspects of the invention presents a modular solution, which offers automatic balancing of the semiconductors on the medium-voltage side. The balancing is controlled, in particular, by the uniform power consumption from each module 5. The circuit divides the otherwise customary medium-voltage transformer in particular into a plurality of individual windings or even individual transformers, which have smaller dimensions and therefore allow higher frequencies.

Furthermore, given the same number of produced systems, the number of identical component parts and hence the production costs of each unit increase on account of scaling effects.

The transformation by the transformer or transformers is carried out, in particular, with an increased frequency, in order to achieve an increased power density, small physical size and low material costs.

The outputs of the modules 5 on the secondary side are, in particular, DC-isolated and, for this reason, can preferably be interconnected arbitrarily permanently in series and/or in parallel or be designed in a reconfigurable manner, in order to supply one or more charging points 22. The DC isolation 28 offers the advantage that it is possible to operate using a lower voltage and lower current and higher frequency and, for example, with a frequency of at least 400 Hz and preferably higher.

The charging apparatus 1 present here has the advantage that not just one vehicle, but at the same time many charging points 22, can be operated with different voltage classes.

What is claimed is:

1. A charging apparatus for charging electrical energy stores for motor vehicles, the charging apparatus comprising:
   at least one conversion device for converting a power supplied from a medium-voltage grid to a power suitable for a charging process of an energy store, wherein the at least one conversion device comprises;
   at least one phase unit connected to at least one phase of the medium-voltage grid, said at least one phase unit having at least two strands, at least one of the at least two strands for a positive component of the at least one phase and at least one of the other at least two strands for a negative component of the at least one phase;
   wherein the at least two strands are associated with at least one module of the at least one phase unit, each module having at least one input unit, at least one inverter unit, at least one transformer unit, at least one rectifier unit associated with at least one transformer unit, and at least one output unit.

2. The charging apparatus as claimed in claim 1, wherein at least two modules are associated with the at least two strands.

3. The charging apparatus as claimed in claim 2, wherein the at least two modules of the at least one phase unit are interconnected in series by a respective input unit.

4. The charging apparatus as claimed in claim 1, wherein the at least one phase unit further comprises at least one DC isolation between the medium-voltage grid and the energy store that is to be charged, and wherein the DC isolation is provided by the at least one transformer unit.

5. The charging apparatus as claimed in claim 1, wherein the at least one conversion device comprises at least two phase units at least two phases provided by the medium-voltage grid.

6. The charging apparatus of claim 1, wherein the at least one conversion device comprises at least three phase units.

7. The charging apparatus as claimed in claim 6, wherein the at least three phase units are interconnected with one another by respective strands.

8. The charging apparatus as claimed in claim 7, wherein the at least three phase units are interconnected in parallel.

9. The charging apparatus as claimed in claim 1, wherein the at least one input unit comprises at least one passive rectifier device.

10. The charging apparatus as claimed in claim 1, wherein the at least one input unit comprises at least one active rectifier device.

11. The charging apparatus as claimed in claim 10, wherein each of the at least one active rectifier device includes at least one of a phase gating controller, an insulated-gate bipolar transistor, or a field-effect transistor.

12. The charging apparatus as claimed in claim 2, wherein the at least two modules are at least partially operatively connected to one another by at least one control device such that at least one of a respective input unit or a respective inverter unit is configured to be driven by the at least one control device.

13. The charging apparatus as claimed in claim 1, wherein the at least one inverter unit comprises at least one of a dual-active-bridge device with soft switching means, a dual-active-bridge device without soft switching means, a five-level neutral-point-clamped inverter with soft switching means, or a five-level neutral-point-clamped inverter without soft switching means.

14. The charging apparatus as claimed in claim 2, wherein the at least two modules are at least partially interconnected at least one of in parallel or in series by a respective output unit.

15. The charging apparatus as claimed in claim 2, wherein a respective output unit of the at least two modules are interconnected in a controllable manner to change between a parallel, a series, and a mixed interconnection arrangement depending on a characteristic variable.

16. The charging apparatus as claimed in claim 1, further comprising:
a plurality of charging points, to which a respective energy store is configured to be coupled and wherein the plurality of charging points are supplied with the power required for the charging process of the energy store by a respective at least one phase unit.

* * * * *